Dec. 19, 1933.    J. P. COE    1,940,077
VEHICLE TIRE AND METHOD OF MAKING THE SAME
Filed April 1, 1930
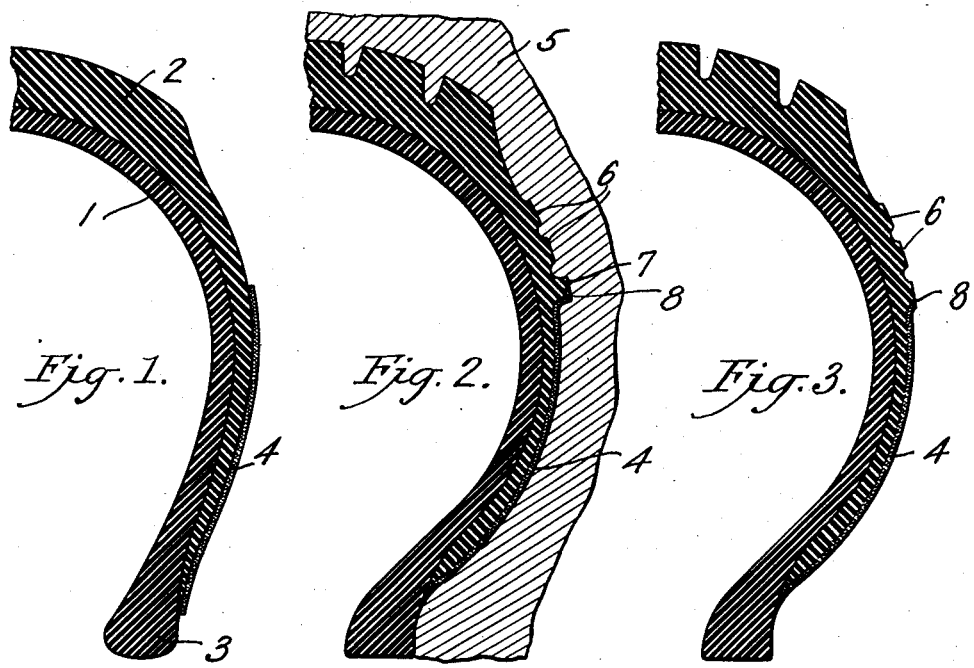
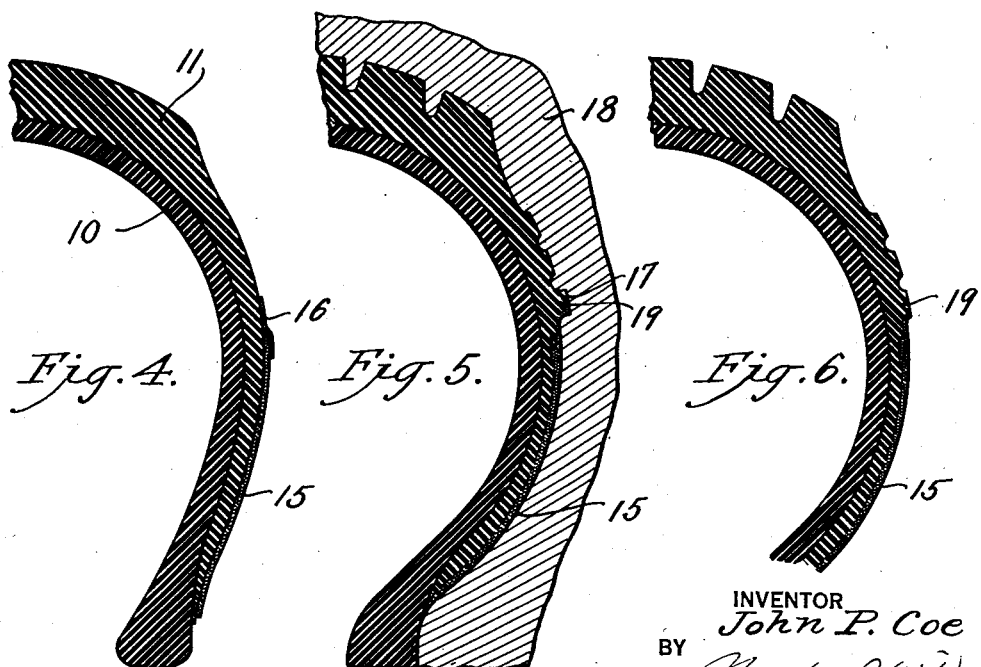
INVENTOR
John P. Coe
BY
ATTORNEY Patented Dec. 19, 1933

1,940,077

UNITED STATES PATENT OFFICE 1,940,077

VEHICLE TIRE AND METHOD OF MAKING THE SAME

John P. Coe, Yonkers, N. Y., assignor to Morgan & Wright, Detroit, Mich., a corporation of Michigan Application April 1, 1930. Serial No. 440,655

9 Claims. (Cl. 154—14)

My invention relates to vehicle tires and methods of making the same, and more particularly to the provision of regular and even joints between stocks of different characteristics used in such tires.

In manufacturing vehicle tires it is often desired to use stocks of different characteristics in different portions of the surface. For example the tread portion of a tire is made of black rubber or rubber compound, while the side walls are of a different color, the color white being frequently used. Where different stocks are brought together and united in curing or vulcanizing tires, it has been difficult heretofore to secure a regular and even line or seam at the meeting surfaces of such stocks due to differences in the movements of the edges of the stocks. As such joints constitute complete circles in finished tires and are visible, an irregular joint gives an untidy appearance to the tire, even though the tire is mechanically perfect. As appearance plays a considerable part in the manufacturing and designing of automobiles and automobile tires, it is desirable to provide a smooth regular joint between the tread stock and the side wall stock, the latter being subject to color variation, as desired.

I provide a tire in which a side wall of a color differing from the tread stock is united with the tread stock in a smooth even and regular joint by applying the tread stock over the tread portion of the tire carcass and beneath the side wall cover. Each side of the tire is then covered with a strip of rubber of the desired color or other characteristics which terminates well up the outer surface of the tire walls. Where circumferential ridges appear in the finished tire, the applied strip preferably terminates in the area which, during the molding operation, forms one of the ridges. During the curing or vulcanizing operation, the joint of the applied material and the tread stock is at a groove in the tire mold. Thereafter the outer surface of the projection formed in the mold groove is buffed, or otherwise cut down, so as to expose a uniform joint between the tread stock and the applied stock substantially at a corner of a ridge. Where the joint is formed in a circumferentially extending rib or ridge, less effort is required in exactly positioning the applied material, since a margin or latitude equal to the width of the rib is permitted in the application of the strip.

The accompanying drawing illustrates certain present preferred embodiments of the invention and the steps taken in manufacturing the same, in which Figure 1 is a cross sectional view of a tire carcass and attached tread and side wall stocks before a curing operation;

Fig. 2 is a cross sectional view of a portion of a tire carcass and mold during the curing step;

Fig. 3 is a cross sectional view of a portion of a completed tire; and

Figs. 4, 5 and 6 are views of a modified form of the invention corresponding to Figs. 1, 2 and 3, respectively.

Referring to Figs. 1 to 3, inclusive, a tire carcass 1 of the usual construction is provided with a tread stock 2 which extends well down the side walls of the tire towards the bead 3. The tread stock is usually black. When it is desired to give a color effect to the side walls of the tire, a strip 4 is applied to each side wall and overlapping the tread stock 2. The thickness of the stock constituting the strip 4 is sufficient to withstand the ordinary wearing conditions to which side walls of tires are usually subjected without exposing the underlying tread stock. The strip 4 extends upwardly from the bead 3 to approximately the position desired for the line or joint of color marking. Where circumferential ridges or ribs appear in the tire below the shoulder of the tire tread, the edge of the strip 4 terminates in the approximate position of one of the ribs, thereby requiring less certainty in the positioning of the strip 4 than where the surface of the tire is smooth.

The assembled tire carcass and surface stocks are then placed in a mold 5 having the necessary configuration to produce the tread design, and to produce circumferential ribs or ridges 6. A recess 7 is formed in the mold of a greater depth than the grooves which form the ribs 6. During the application of temperature and/or pressure internally of the tire carcass to cause it to conform to the shape of the mold 5 and during vulcanization, the adjacent stock fills the groove 7. The lower portion of the projection 8 formed in the groove 7 is composed of material from the strip 4, while the upper portion is filled with tread stock.

After vulcanization the mold 5 is removed and the projection 8 is buffed, or otherwise worked down, to conform in height to the ribs 6. During this operation, the irregular joint portions of the stocks, at the outer surface of the projection 8, are removed and a uniform even joint is provided at the corner of the rib. As the material constituting the inner or root portion of projection 8 does not move as much as the outer edges, the material is joined along a substantially uniform line as compared with the ragged surface existing at the outer edges.

Referring to Figs. 4, 5 and 6, a tire carcass 10 corresponding to the carcass 1 in the other form of the invention, is provided with a tread stock 11. A side wall strip 15 is placed along each side wall. The strip 15 is narrower than the strip 4 shown in the other form of the invention and is located with less precision. The thickness of the strip 15 is such as to withstand ordinary wearing conditions to which side walls of tires are usually subjected.

A narrower strip 16 of thinner stock than the strip 15 is placed along the upper or outer edge of the strip 15. The strip 16 constitutes the portion of the colored side wall stock which is worked into a groove 17 in a mold 18 for forming a projection 19 which is afterwards buffed, or otherwise cut down, corresponding to the rib 8 in Fig. 3. The use of a thinner top strip for the colored side wall stock is advantageous in that it does not require accurate positioning of the main side wall strip 15, and also because it requires less buffing to remove the surplus material from the projection 19. The presence of the projection 19 immediately above the strip 16 protects the latter from undue wear.

While I have shown and described certain present preferred embodiments of the invention and methods of making the same, it will be understood that the invention may be otherwise embodied and practiced within the spirit of the invention and the scope of the appended claims.

Having thus described my invention, what I claim and desire to protect by Letters Patent is:

1. A vehicle tire comprising a carcass, a layer of tread stock applied thereto and extending down a side wall thereof, and a layer of stock having different characteristics applied over the tread stock along the side wall and terminating in a circumferentially extending rib.

2. A vehicle tire comprising a carcass, a layer of tread stock applied thereto and extending down a side wall thereof, and a layer of stock having different characteristics applied over the tread stock along the side wall and a strip applied to the outer edge of the second named layer.

3. A vehicle tire comprising a carcass, a layer of tread stock applied thereto and extending down a side wall thereof, and a layer of stock having different characteristics applied over the tread stock along the side wall and a strip applied to the outer edge of the second named layer and terminating in a circumferentially extending rib.

4. In the method of making a vehicle tire, the steps consisting in applying a tread stock to the tread portion and a side wall of a tire carcass, applying a side wall strip of different characteristics over the tread stock, and forming a rib at the junction of said stock and strip for exposing an even joint.

5. In the method of making a tire, the steps consisting in applying a tread stock to a tread portion and side wall of a tire carcass, applying a side wall strip to the tread stock, applying a thinner strip to the outer edge of said strip and working said last named strip into a rib defining a joint between said side wall strip and said tread stock.

6. In the method of making a joint between plastic materials of different characteristics, the steps consisting in forming a projection of the end portions of said materials at the joint and then severing the projection.

7. An automobile tire comprising a tread stock, a side wall stock of different characteristics, and a circumferentially extending ridge formed adjacent the joint between said stocks for locating the exposed joint between said stocks.

8. In the method of making a vehicle tire, the steps consisting in applying a tread stock to the tread portion and at least a portion of a side wall of a tire carcass, applying a side wall strip of different characteristics over the tread stock, forming a rib at the junction of said stock and strip, and severing a portion of the rib to expose an even joint.

9. In the method of making a tire, the steps consisting in applying a tread stock to a tread portion and at least a portion of the side wall of a tire carcass, applying a side wall strip to the tread stock, applying a thinner strip to the outer edge of the first mentioned strip, working said last named strip into a rib, and severing a portion of the rib to expose an even joint between the side wall strip and said tread stock.

JOHN P. COE.